Aug. 23, 1966 R. L. FUNK 3,268,229

PORTABLE PHONOGRAPH

Filed Nov. 4, 1963 3 Sheets-Sheet 1

INVENTOR:
ROGER L. FUNK,

BY Thomas A. Briody
HIS ATTORNEY.

Aug. 23, 1966 R. L. FUNK 3,268,229

PORTABLE PHONOGRAPH

Filed Nov. 4, 1963 3 Sheets-Sheet 2

INVENTOR:
ROGER L. FUNK,

BY Thomas A. Briody
HIS ATTORNEY.

Aug. 23, 1966 R. L. FUNK 3,268,229

PORTABLE PHONOGRAPH

Filed Nov. 4, 1963 3 Sheets-Sheet 3

INVENTOR:
ROGER L. FUNK,

BY Thomas A. Briody
HIS ATTORNEY.

United States Patent Office 3,268,229 Patented August 23, 1966

3,268,229
PORTABLE PHONOGRAPH
Roger L. Funk, Liverpool, N.Y., assignor to General Electric Company, a corporation of New York
Filed Nov. 4, 1963, Ser. No. 321,052
2 Claims. (Cl. 274—1)

This invention relates to an improvement in phonographs, and in particular to portable phonographs of the type wherein a plurality of speakers are positioned within a portable housing structure.

One type of phonograph which has been used in widespread fashion is the portable phonograph, which is of relatively light weight and may be readily carried from place to place. In designing a portable phonograph it is important that careful consideration be given to its compactness of construction, and economy of cost as well as its sound reproducing efficiency. An important object of the present invention is to provide a new and improved portable phonograph which is characterized by compactness in construction and economy of cost, while also providing a relatively high sound reproducing efficiency.

Another object of my invention is to provide for a stereophonic sound reproducing device a speaker enclosure of novel configuration and arrangement.

A further object of my invention is to provide an improved phonograph of the type which supplies stereophonic sound reproduction, which phonograph is contained in a housing that is very compact in structure.

A still further object of my invention is to provide a speaker enclosure of novel configuration which effectively cooperates with a record player to provide a phonograph of compact construction.

In carrying out my invention, in one form thereof, I provide a record player supported within a housing. The record player mechanism includes a turntable, with a record positioning spindle and tone arm arranged thereon. The housing includes a first portion upon which the record player is supported and a second portion in pivoted cooperable relationship with the first portion. The second housing portion is pivotally movable between open and closed positions to allow selective access to the record player or containment thereof. The second portion has a recess formed therein which overlies the record player when the second portion is in its closed position. Within this recess, in accordance with the present invention, there is seated a speaker enclosure having a generally V-shaped cross-section. The speaker enclosure is concave with respect to the record player to provide a cavity therein for receiving the spindle and tone arm of the record player when the second portion is in its closed position. A pair of speakers are mounted respectively on arms of the enclosure so that they face in convergent directions and are spaced substantially from the apex of the enclosure. With such an arrangement, the cooperation of the spindle and the tone arm with the cavity of the speaker enclosure provides an overall device which is compact in construction and the arrangement of the speakers on the enclosure provides an efficient stereophonic sound response.

Further aspects of my invention will become apparent hereinafter, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawings, in which:

Figure 1:
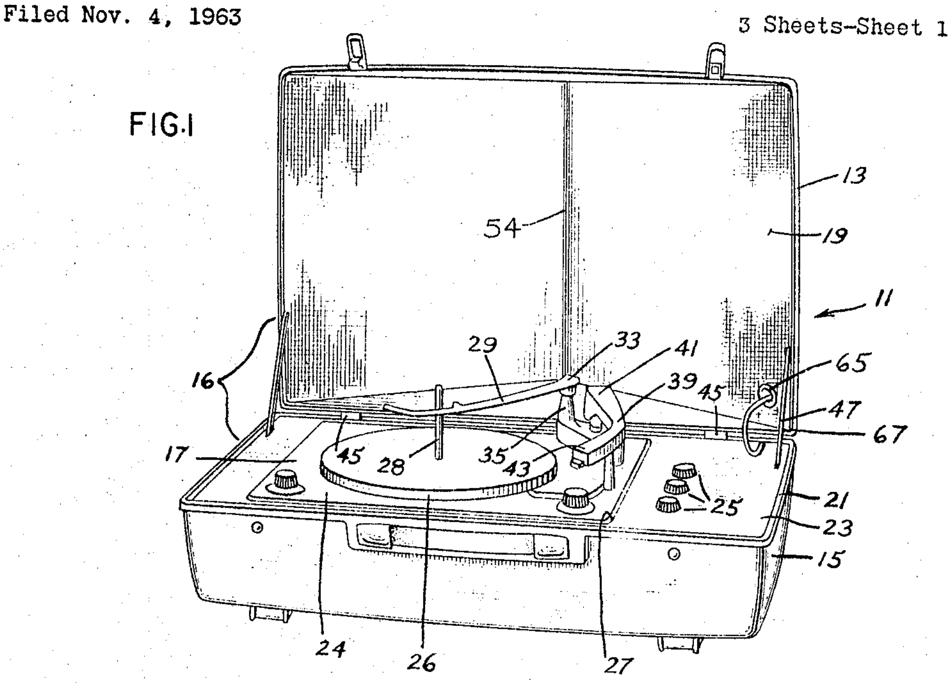
FIG. 1 is a perspective view of an improved portable phonograph embodying my invention, in one form thereof, with the housing for the phonograph being shown in an open position.
Figure 2:
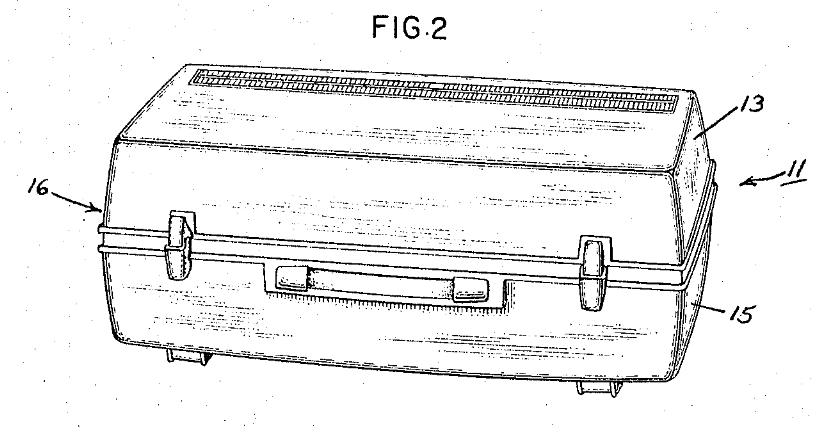
FIG. 2 is a perspective view of the phonograph of FIG. 1, with the housing being shown in a closed position.

Referring first to FIG. 1, as shown therein I have provided a portable phonograph unit 11 comprising a first housing portion 13 and a second housing portion 15 which cooperate to provide a protective enclosure 16 for a record player 17, a dual channel amplifier (not shown), and a speaker enclosure 19. The construction and arrangement of the speaker enclosure 19 in the phonograph housing forms an important aspect of the present invention, as shall become apparent hereinafter.

The second housing portion 15, as shown in FIG. 1, has a generally rectangular, box-shaped configuration, and it is recessed to receive the dual channel amplifier as well as the underlying part (not shown) of record player 17. On the open side 21 of the second housing portion 15 there is arranged in horizontal fashion (viewing FIG. 1) a panel 23. Above panel 23 near the right side thereof (viewing FIG. 1) are mounted suitable controlling knobs 25 for operating the dual channel amplifier. Near the center of panel 23 and located nearer to the left side than to the right side thereof (viewing FIG. 1) there is formed a rectangular slot 27. Within slot 27 there is mounted the record player 17.

The record player 17 comprises a record player frame 24 mounted on panel 23, and a turntable 26 carried on frame 24. For centering records and positioning them in the desired relationship with turntable 26, a spindle 28 extends upwardly from turntable 26 and projects outwardly from the open side 21 of the second and lower housing portion 15.

Figure 3:
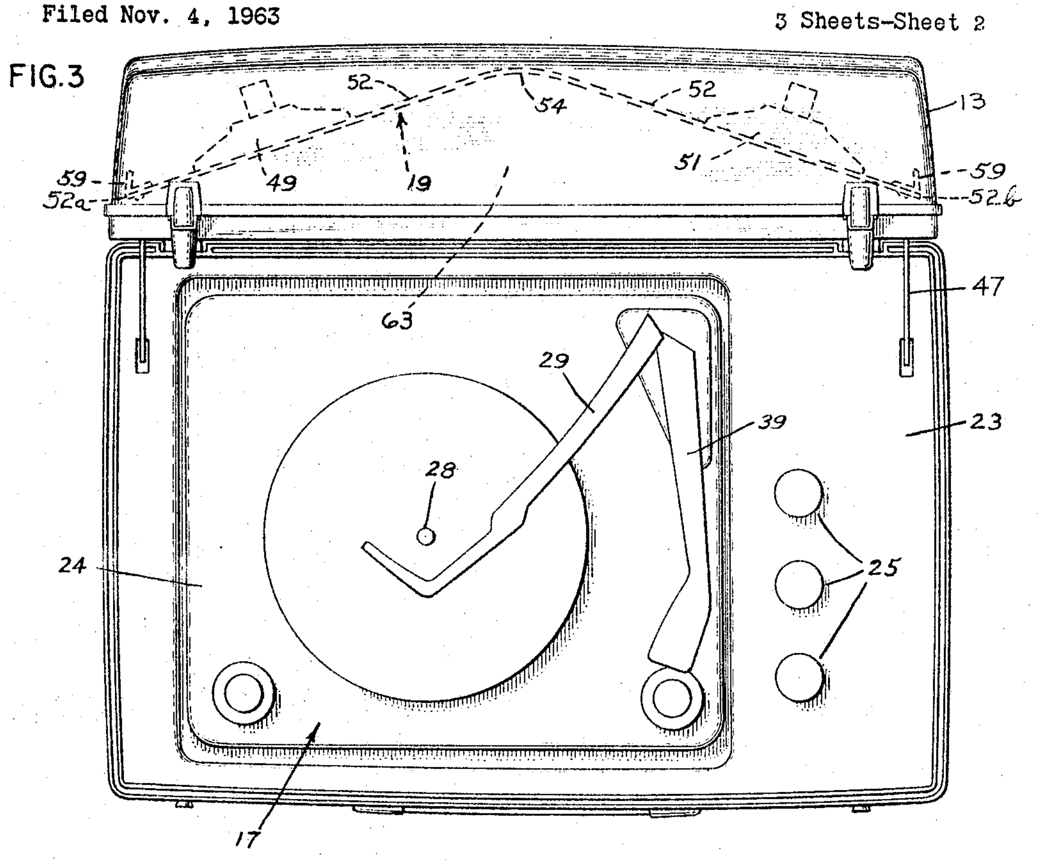
FIG. 3 is a plan view of the phonograph as shown in FIG. 1.

The record player 17 shown is an automatic record changer type, and employs a record balancing arm 29. The arm 29 is arranged in general parallel to the turntable 26, and it is carried by attachment of its rear end 33 to a vertical post member (not shown). This vertical post member is rotatably journalled in upright 35 and may be raised and lowered, in the usual fashion. The balancing arm 29 is thus arranged on the record player 17 so that it may be raised and lowered, and is swingable sideways from its raised position for loading records upon the spindle 28. More particularly, for loading records on the spindle 28, the balancing arm 29 may be raised and swung angularly from a position wherein its free end generally overlies the spindle 28 (as shown in FIG. 3) to a position wherein its free end is adjacent to but spaced laterally outwardly from the periphery of a record which is to be loaded (viewing FIG. 1). The balancing arm 29 may then be located in a detented position to allow clearance for a record to be loaded upon spindle 28.

Figure 5:
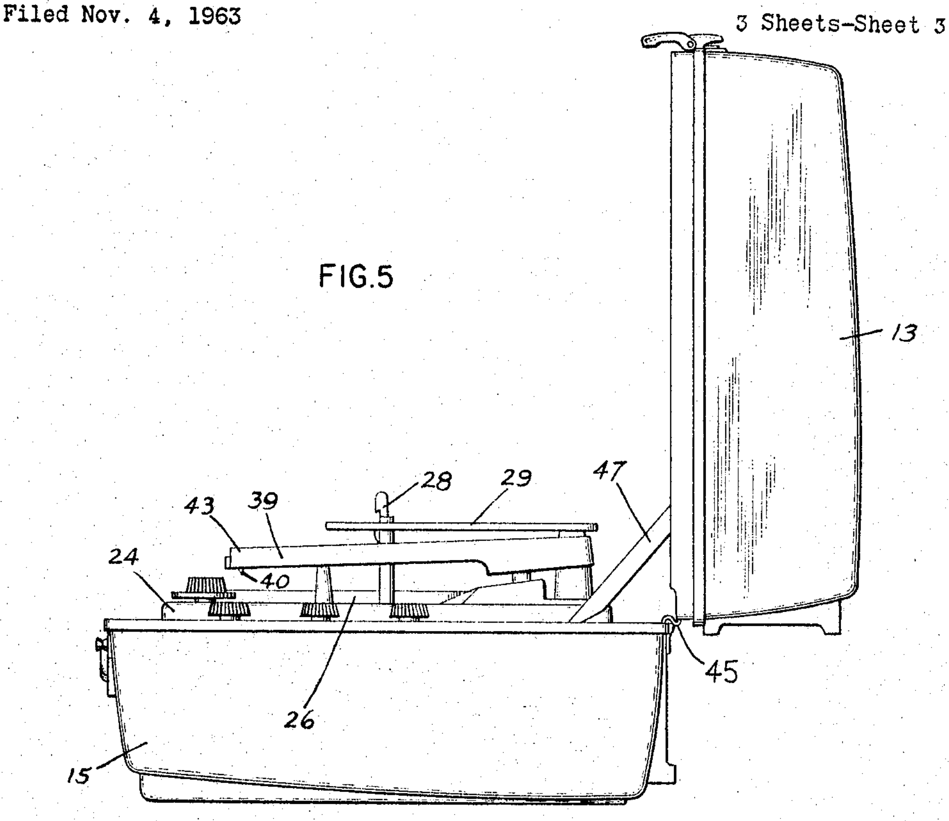
FIG. 5 is a right end view of the phonograph as shown in FIG. 1.

A tone arm 39 is located alongside of and above turntable 26, and is provided with a pivotal support near its rear end 41, in the well known manner. The arm 39 is pivotally supported so that vertical and horizontal movement is permitted and a pickup stylus or needle 40 (FIG. 5) located at the free end 43 of the arm can engage and reproduce sound signals from the groove of a phonograph record placed on the turntable 26.

From viewing FIG. 1 it will be noted that the spindle 28, overarm 29 and tone arm 39 each are located substantially above the open end 21 of the second housing portion 15.

Figure 4:
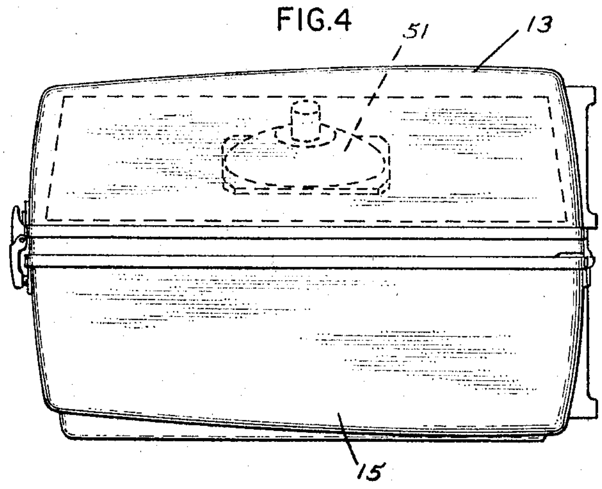
FIG. 4 is a right end view of the phonograph as shown in FIG. 2.

To provide a compact overall phonograph unit capable of efficiently reproducing a stereophonic sound effect, in accordance with an important aspect of my invention, the first housing portion 13 has the speaker enclosure 19 ensconced therein. As shown in FIG. 1, the first housing portion 13 has a rectangular, box-shaped configuration, and it is pivotally supported upon the bottom or second housing member 15 by means of readily detachable hinges 45. The hinges are attached to mating elongated and abutting side surfaces of the portions 13 and 15 to enable the cover-like first housing portion 13 to pivot approximately 90 degrees between an open position (FIG. 5) and a closed position (FIG. 4). For limiting the pivotal opening movement of the cover portion 13 of the housing with respect to the base portion 15, rods 47 are pivotally linked to opposing sides of the cover portion 13 (FIG. 1) and slidably cooperate with appropriate slots formed in panel 23 of the base portion 15.

Figure 6:
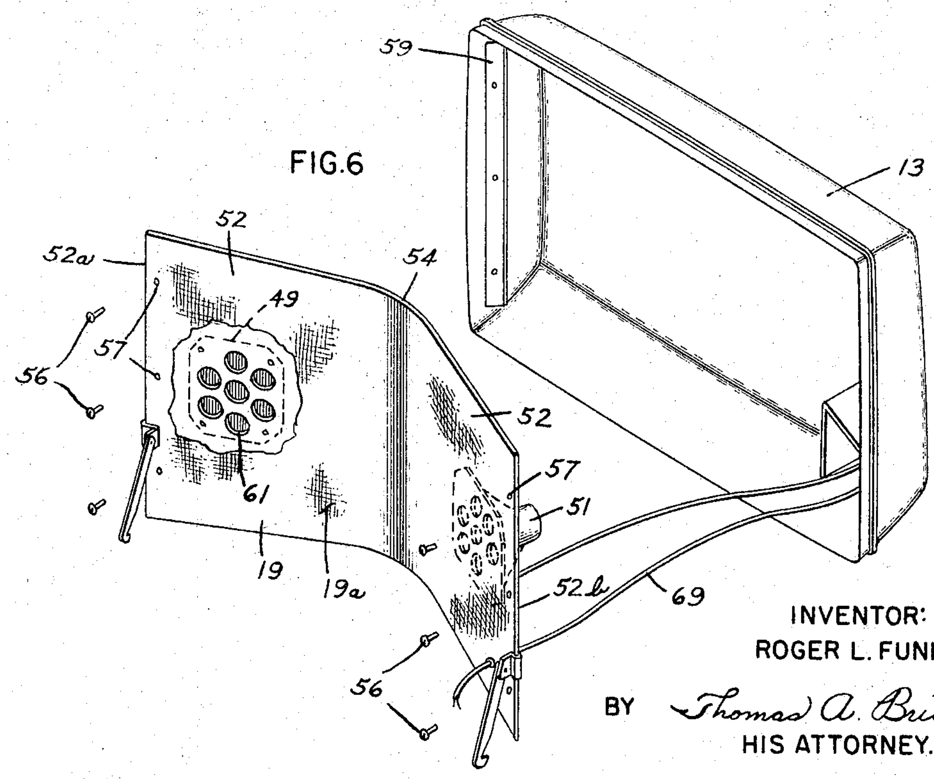
FIG. 6 is an exploded perspective view of the lid portion of the housing of the phonograph, showing the detailed construction of the speaker enclosure and its two associated speakers.

To enable the first housing portion 13 or cover part of the housing enclosure 16 to effectively accommodate the spindle 28, record balancing arm 29 and tone arm 39 while at the same time enclosing a pair of sterephonically operable speakers 49 and 51, as shown in FIGS. 1 and 3, the speaker enclosure 19 has a shallow V-shaped configuration when viewed from the open side of portion 13. More particularly, as further shown in FIG. 6, the speaker enclosure 19 is constructed from a suitable sheet of rigid material, and it includes a pair of planar arm sections 52 joined together at a uniformly curved apex portion 54. As shown in FIG. 3, the portion 54 is located adjacent the inner surface of housing cover 13, midway between its sides. Portion 54 is also concave when viewed from the open side of the cover 13. In the illustrated unit 11, the included angle between the two arm sections 52 may be approximately 135 degrees. The outer ends **52*a* and 52*b*, respectively, of the arms 52 are clamped into secure engagement with cover portion 13 by means of screws 56 which extend through apertures 57 of the enclosure 19 and thread into engagement with associated apertures of brackets 59**, one of which is shown in FIG. 6.

As thus shown in FIG. 3, when cover 13 is in its open position the planar arm sections 52 are disposed in perpendicular relationship to panel 23 of the phonograph unit, and they are divergent from the apex portion 54, in a direction toward the record player 17. It will also be noted that when the cover 13 of the housing 16 is in its open position, the axis of curvature of apex portion 54 of enclosure 19 is parallel to spindle 28 of the record player.

Behind and near the outer end of each arm 52, in accordance with my invention, there is mounted a speaker unit. More specifically, the frontal face of speaker 49 is suitably secured to the rear of one planar arm 52, near its end **52*a*, and the frontal face of the other speaker 51 is suitably secured to the rear of the other planar arm 52, near its end 52*b*. To allow sound to emanate from each of the speakers 49 and 51 while at the same time protecting the cone thereof and helping to support grill cloth 19*a*, a series of cutout apertures 6** are formed in the enclosure at the front of each speaker (FIG. 6).

The speakers 49 and 51 are spaced apart and mounted on the planar arms 52 of speaker enclosure 19 so that they are axially directed in convergent fashion toward the record changer 17 (see FIG. 3). With such an arrangement, when each of the speakers 49 and 51 is suitably connected to an associated channel of the aforementioned dual channel audio amplifier, an efficient stereophonic effect is achieved. This effect is due in part to the directionality of the loudspeaker, which provides an improved reproduction toward the high frequency range. Thus, more particularly, by way of example, when a person has his two ears located near to the front of the phonograph unit 11, in view of the spacing and convergent directionality of the speakers 49 and 51 an enhanced stereophonic effect may be received for certain sounds of relatively high frequency.

It will also be realized that the directionality of the speakers 49 and 51 of my improved phonograph unit may be readily varied simply by altering the included angle between the planar portions 52 of the enclosure 19 before it is assembled into cover 13.

With further regard to the shallow V-shaped configuration of the speaker enclosure 19 of cover 13, it will be noted, as shown in FIG. 3, that a cavity 63 is provided in the recess of cover 13. The cavity 63 effects a gradually increasing outwardly facing recess between the sides of the cover and the center thereof. When the cover 13 of the phonograph unit 11 is closed, the cavity 63 effectively serves to accommodate the spindle 28, balancing arm 29 and tone arm 39, therein.

It will thus be seen that by making the speaker enclosure 19 with a shallow V-shaped configuration and disposing this enclosure in the phonograph housing as described above, a very compact housing unit is obtained which readily lends itself to effective sterephonic sound reproduction.

As also shown in FIG. 1, an eyelet 65 is formed in the speaker enclosure 19 near the inside corner 67 thereof. Eyelet 65 receives suitable lead wires 69 from the dual channel amplifier for connections to the two speakers 49 and 51.

It will now, therefore, be understood that in accordance with the present invention I have provided an improved stereophonic sound reproducing device of compact construction and arrangement and efficient operation. It will be further realized that my improved speaker enclosure arrangement readily lends itself to expeditious utilization in portable phonographs as well as a wide variety of other phonograph applications.

While in accordance with the patent statutes, I have described what at present is considered to be the preferred embodiment of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. In a device for reproducing sound, an automatic record player mechanism including an elongated spindle and a tone arm positioned on a turntable, housing means including a first portion upon which said record player mechanism is supported and a second portion in pivoted cooperable relationship with said first portion, said turntable being located at the top of said first portion with said spindle and tone arm projecting upwardly and outwardly from said top, said second portion being movable between open and closed positions thereby to open and close said housing means for enabling selective access to said record player mechanism and protection thereof, said second portion having a recess therein facing and overlying said record player when said second portion is in its closed position, and a single speaker enclosure ensconced within said recess, said speaker enclosure comprising a single sheet of substantially rigid material disposed in a V-shaped configuration in said recess to provide a uniform and continuous V-shaped cavity overlying said automatic record player when the second portion of the housing means is in its closed position, said cavity of the second housing portion being arranged with respect to the top of said first housing portion to receive said spindle and said tone arm when said second housing portion is in its closed position, whereby the cooperation of said spindle and tone arm with the cavity of said speaker enclosure provides an overall device which is efficient in operation and compact in construction.

2. In a device for reproducing sound stereophonically, an automatic record player mechanism including an elongated spindle and a tone arm positioned on a turntable, housing means including a first portion upon which said record player mechanism is supported and a second portion in pivoted cooperable relationship with said first portion, said turntable being located at the top of said first portion with said spindle and tone arm projecting upwardly and outwardly from said top, said second portion being movable between open and closed positions thereby to open and close said housing means for enabling selective access to said record player mechanism and protection thereof, said second portion having a recess therein facing and overlying said record player when said second portion is in its closed position, a single speaker enclosure ensconced within said recess, said speaker enclosure comprising a single V-shaped sheet of substantially rigid material, said sheet including a pair of relatively flat outstretched arms and being disposed in said recess to provide a uniform and continuous V-shaped cavity overlying said automatic record player when the second portion of the housing means is in its closed position, said cavity of said second housing portion being arranged with respect to the top of said first housing portion to cooperatively receive said spindle and said tone arm when said second portion is in its closed position, and a pair of speakers one of which is mounted on each of said arms, said speakers being spaced apart and arranged on said arms so that they are directed in convergent fashion toward said record player thereby to provide an efficient stereophonic response.

References Cited by the Examiner

FOREIGN PATENTS

| | | |
|---|---|---|
| 1,130,607 | 10/1956 | France. |
| 1,215,356 | 11/1959 | France. |
| 606,355 | 7/1960 | Italy. |

NORTON ANSHER, *Primary Examiner.*

C. B. PRICE, *Assistant Examiner.*